United States Patent [19]

Fujimoto et al.

[11] Patent Number: 5,465,860
[45] Date of Patent: Nov. 14, 1995

[54] METHOD OF FORMING AN INTEGRATED CIRCUIT WAVEGUIDE

[75] Inventors: Harry H. Fujimoto; Siddhartha Das, both of Sunnyvale, Calif.

[73] Assignee: Intel Corporation, Santa Clara, Calif.

[21] Appl. No.: 270,051

[22] Filed: Jul. 1, 1994

[51] Int. Cl.$^6$ ................................................. C23F 1/02
[52] U.S. Cl. ................................................. 216/24; 216/75
[58] Field of Search .................... 156/643, 652, 156/656, 668; 385/143, 145, 130, 132; 216/75, 24

[56] References Cited

U.S. PATENT DOCUMENTS

| | | | |
|---|---|---|---|
| 5,054,872 | 10/1991 | Fan et al. | 385/130 |
| 5,136,682 | 8/1992 | Moyer et al. | 385/141 |
| 5,142,605 | 8/1992 | Diemeer et al. | 385/130 |
| 5,165,004 | 11/1992 | Okamoto et al. | 385/132 |
| 5,170,461 | 12/1992 | Yoon et al. | 385/143 |
| 5,282,078 | 1/1994 | Horsthuis | 156/668 |
| 5,291,574 | 3/1994 | Levenson et al. | 156/662 |
| 5,352,566 | 10/1994 | Springer et al. | 385/132 |

OTHER PUBLICATIONS

Electro–Optic Polymer Devices, Lytel et al., *Electronic Packaging Materials Science, VI,* Materials Research Society Spring Mtg., San Francisco, Calif. (Apr. 1992), paper G9.1, pp. 1–18.

Large Scale Integration of Electro–optic Polymer Waveguide, Lytel et al., *Polymers for Lightwave and Integrated Optics: Technology & Applicaitons,* Hornak (M. Dekker, 1992)pp. 48–54.

*Primary Examiner*—George Fourson
*Assistant Examiner*—Thomas G. Bilodeau
*Attorney, Agent, or Firm*—Blakely, Sokoloff, Taylor & Zafman

[57] ABSTRACT

Manufacturing techniques for forming waveguide channels and devices. A trench is formed in a cladding layer through an opening in a conductive layer. The trench is then filled with an active waveguide polymer and the conductive layer is patterned such that the active waveguide polymer may be poled. Also, a trench may be isotropically etched through a cladding layer to an underlying etch stop layer. The etch stop layer is thereafter removed from within the trench region to expose a previously formed, smooth, underlying cladding layer. Finally, a waveguide formed in a cladding layer, bounded in width by an overlying barrier layer, underlies a masking layer having a gap formed therein. Within the gap, a portion of the waveguide channel along with juxtaposing sections of the barrier layer are exposed. An etch is thereafter performed to remove the portion of the waveguide polymer in the waveguide channel bounded by both the masking layer and the barrier layer. Then an alternate type of waveguide polymer is formed in the void left behind by the etched waveguide polymer in the waveguide channel. Thus, a single waveguide channel having a plurality of waveguide polymers is formed.

19 Claims, 6 Drawing Sheets

FIG_1

FIG_2

FIG_3

FIG_4A

FIG_4B

FIG_4C

FIG_4D

FIG_4E

FIG_4F

FIG_5A

FIG_5B

FIG_5C

FIG_5D

FIG_6A

FIG_6B

FIG_6C

FIG_6D

FIG_6E 5,465,860

METHOD OF FORMING AN INTEGRATED CIRCUIT WAVEGUIDE

FIELD OF THE INVENTION

The present invention relates to optical integrated circuits and more particularly to a method of forming waveguide channels and devices.

BACKGROUND OF THE INVENTION

As the demand for more powerful microprocessors increases, so must advance the interconnection technology of the integrated circuit (IC). Because an optical signal can travel at a velocity many times faster than an electrical signal, an optical interconnect has the inherent ability to transmit data at higher speeds. In addition, unlike electrical signals, optical pulses are able to cross paths with other optical pulses without interfering with each other, and optical signals are not susceptible to crosstalk. Therefore, it is possible to route a multitude of optical signals in a single interconnect level where multiple interconnect levels would be required for an equivalent electrical circuit. For these and other reasons, optical waveguide interconnects would seem the logical choice to replace electrical interconnects in advanced IC designs.

Figure 1:
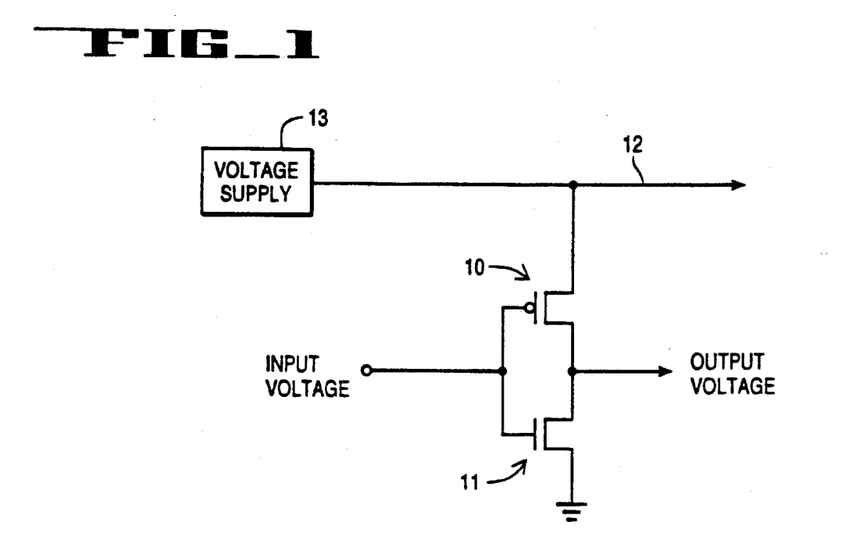
FIG. 1 is an illustration of an electrical input buffer.

The simple inverter circuit shown in FIG. 1 is representative of an input buffer for an IC. If the input voltage shown in FIG. 1 is low, P-channel transistor 10 will be turned on while N-channel transistor 11 will be turned off. This will allow the voltage supplied by voltage supply 13 to flow through transistor 10 and appear at the output. This output voltage is then routed to the rest of the circuit. Note that the voltage supply is carried throughout the integrated circuit by power supply line 12. Multiple input buffers, like the one shown in FIG. 1, may then individually tap the voltage off the single power supply line 12 and feed the remainder of the IC. Thus, only a single voltage supply 13 is required to operate the IC. Such a power supply scheme minimizes space and reduces power consumption and complications for both the manufacturer and user of the IC.

Figure 2:
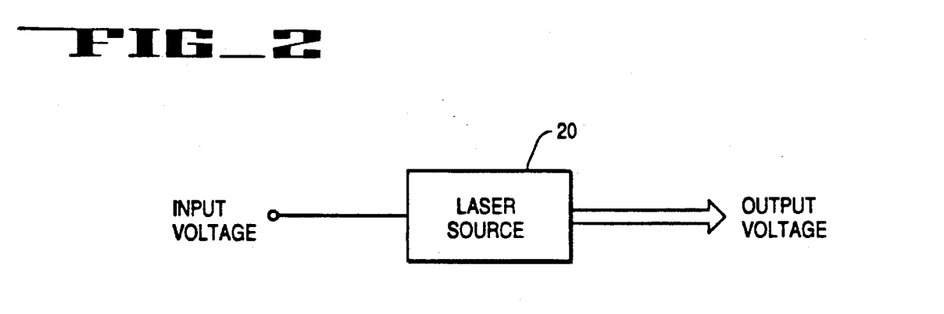
FIG. 2 is an illustration of a conversion of a voltage signal to a light signal.

To employ an optical interconnection, IC data must first be converted into light pulses before being routed by the optical interconnects. As shown in FIG. 2, an input voltage must trigger laser source 20 to produce the output light. It is this output light which is then routed through an optical interconnect or waveguide to a distant circuit. Upon arriving at its destination, the light pulse may then be reconverted back into a voltage level so that the receiving circuit can manipulate the data in a more conventional manner. A typical advanced IC may have thousands of electrical interconnect lines. If the voltage on each of these interconnect lines must be independently converted to a separate and distinct light signal, thousands of individual laser sources, like the one shown in FIG. 2, would be required to generate the light signals. Such a scheme would be incompatible with current IC technology due the expense and lack of reliability associated with such an arrangement.

To make optical integrated circuits (OIC) feasible, a scheme analogous to the one depicted in FIG. 1 must be employed where the voltage supply 13 of FIG. 1 is replaced with a single laser supply and is routed throughout the OIC as an optical power supply.

Figure 3:
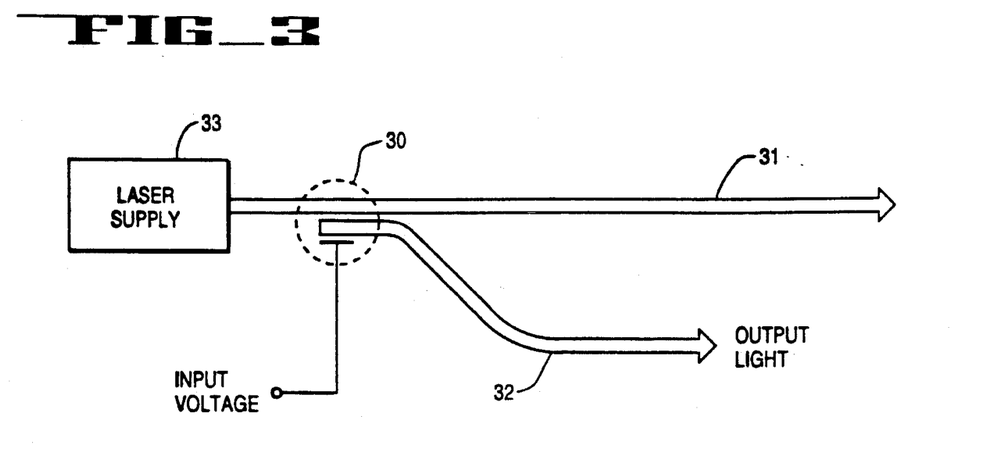
FIG. 3 is an illustration of a railtap.

FIG. 3 is a schematic diagram indicative of how an optical power supply scheme might be implemented. A single laser 33 is used to supply the light source along optical power supply line 31. Responsive to the input voltage level, optical output line 32 may then tap a small portion of the light source from line 31 without significantly draining the overall optical power available on supply line 31. This is done through railtap 30. In such a manner, multiple input voltages can control multiple railtaps all feeding off a single optical power supply.

A railtap generally comprises a channel of a passive waveguide polymer, a channel of an active waveguide polymer, and electrodes through which to induce an electric field about the active waveguide polymer. For example, in FIG. 3, the rail 31 is constructed of a passive waveguide polymer. A passive waveguide polymer is a material having a relatively stable index of refraction and is capable of channeling light. Output light waveguide 32 comprises an active waveguide polymer. An active waveguide polymer is a material whose index of refraction may be adjusted by inducing an electric field across it. By adjusting the index of refraction, the light path in the material may be redirected. The input voltage of FIG. 3 would be the source of that electric field. By adjusting the index of refraction of waveguide 32 in the vicinity of waveguide 31, a small portion of the light traveling down waveguide 31 can be drawn into waveguide 32 in the region 30. Once in waveguide 32, the light will travel down the length of this waveguide until it reaches the circuit to which waveguide 32 is coupled. At this destination, the light may then be converted back into an electrical impulse for manipulation by conventional IC circuitry.

Because only a small portion of the light in waveguide 31 is tapped into waveguide 32, a substantial amount of the light source still remains in waveguide 31. This remaining light may then be tapped by other railtaps responsive to other input voltages existing along the length of waveguide 31. In such a manner, the single laser supply 33 may be used to supply 100 or more railtaps.

Thus, the need for multiple laser supply sources has been reduced.

SUMMARY OF THE PRESENT INVENTION

Manufacturable techniques for forming advanced optical waveguide and waveguide devices are described. In one technique for forming a self-aligned gap pole device, a metal layer is deposited over a cladding layer and a trench is etched through both. The trench is then filled with an active waveguide polymer and is etched back to a level below the level of the metal layer within the trench. The trench is then backfilled with a buffer layer to isolate the active waveguide polymer with the trench. Finally, the metal layer is patterned to create the electrodes necessary to pole the active waveguide polymer within the trench. In another method, a low loss optical waveguide is created by first forming a metal layer between two cladding layers. A trench is then anisotropically etched through the upper cladding layer down to the metal layer. The metal layer is then wet-etched to reveal the underlying lower cladding layer. The trench is then coated with a buffer layer and filled with a waveguide polymer. Finally, a self-aligned, combination active and passive waveguide channel is described which first involves the formation of a metal layer over a cladding layer. A trench is etched through the metal and cladding layers and is filled with a passive waveguide polymer. After the passive waveguide polymer material is etched back to isolate the passive waveguide polymer to within the trench, a mask is formed over the trench having a gap formed therein which exposes a portion of the trench as well as portions of the metal layer. The passive waveguide material is then etched from the portion of the trench exposed by the gap in the masking layer. After the etch is completed, the trench is backfilled with an active waveguide polymer. Thus, an optical waveguide is formed having both active and passive portions. The metal layer may then be patterned to create the electrodes necessary to pole the active waveguide polymer within the trench.

BRIEF DESCRIPTION OF THE DRAWINGS

FIG. 6b is an illustration of a surface view of the substrate of FIG. 6a.

DESCRIPTION OF THE PRESENT INVENTION

Manufacturable techniques for forming optical waveguides and waveguide devices are described. In the following description, numerous specific details, such as layer thickness, process sequences, film compositions, etc. are set forth in order to provide a more thorough understanding of the present invention. It will be obvious, however, to one skilled in the art that the present invention may be practiced without employing such specific details. In other instances, well-known processes and processing techniques have not been described in detail in order not to unnecessarily obscure the present invention.

While diagrams representing preferred embodiments of the present invention are illustrated in FIGS. 4a–6e, these illustrations are not intended to limit the invention. The specific processes described herein are only meant to help clarify an understanding of the present invention and to illustrate preferred embodiments of how the present invention may be implemented in order to form preferred devices. For the purposes of this discussion, a semiconductor substrate is a substrate comprising any material or materials used in the manufacture of a semiconductor device. A substrate is a structure on which or to which a processing step acts upon.

Figure 4A:
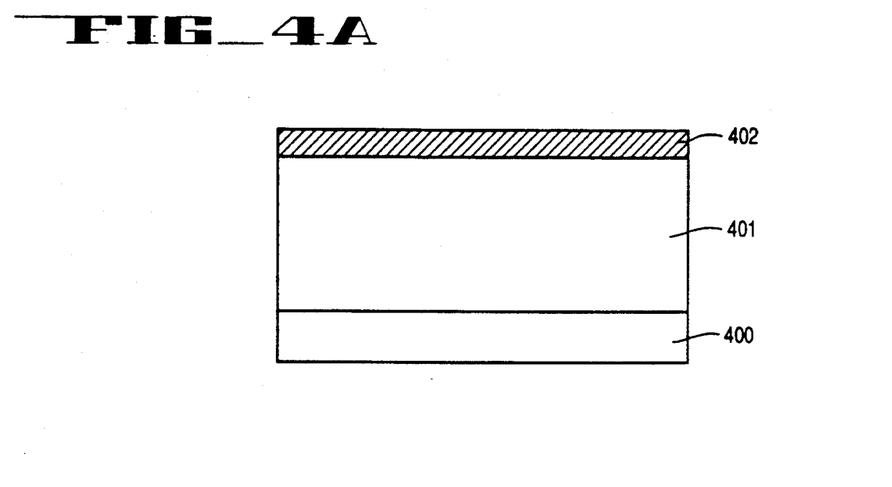
FIG. 4a is an illustration of a cross-sectional view of a substrate.

In a method consistent with the present invention, metal layer 402 and cladding layer 401 are preferably formed over substrate 400 as shown in FIG. 4a. In a preferred embodiment, metal layer 402 is an alloy of aluminum which has been sputtered onto cladding layer 401; cladding layer 401 is composed primarily of a polyimide material which has been spun onto substrate 400; and substrate 400 comprises semiconductor materials and devices such as silicon and oxides thereof. Substrate 400 may additionally comprise other waveguide materials, or alternately, any material capable of sustaining cladding layer 401. Alternatively, metal layer 402 may comprise materials such as substantially pure aluminum (Al), copper (Cu), gold (Au), silver (Ag), and alloys thereof, or any other material, metallic or otherwise, capable of conducting a current. Also, metal layer 402 may be deposited by low temperature chemical vapor deposition (CVD) or another deposition process. Cladding layer 401 may comprise a dielectric material other than polyimide which maintains a relatively stable index of refraction, such as an oxide of silicon (oxide), and is capable of isolating an optical wave to a waveguide channel formed therein. In addition, cladding layer 401 may comprise a multilayer stack including, for instance, additional metal, oxide, nitride, or organic layers to act as an etch stop for a subsequently formed trench as described below. Finally, substrate 400 may comprise any semiconductor material such as silicon and oxides thereof, other cladding or metallic layers, or any other materials suitable for cladding deposition. In general, materials chosen for forming the structure of FIG. 4a should be capable of being deposited at temperatures low enough so as not to destroy any underlying devices.

Figure 4B:
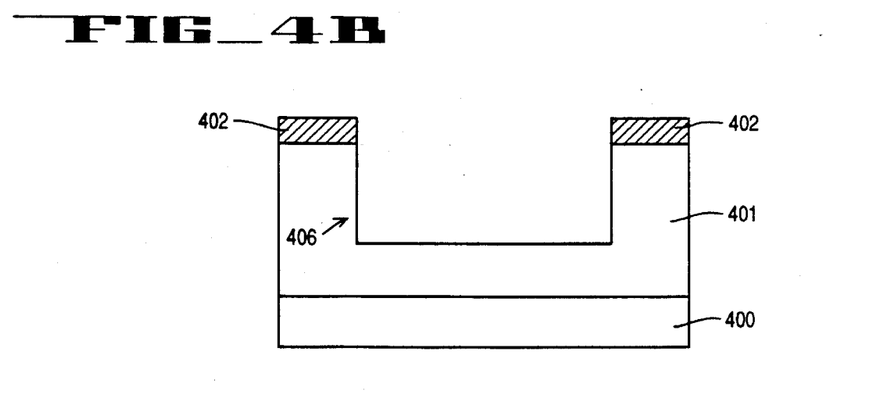
FIG. 4b is an illustration of a cross-sectional view of the substrate of FIG. 4a after a trench has been formed.

As shown in FIG. 4b, an opening is made in metal layer 402 through which trench 406 is etched into cladding layer 401. Standard photolithographic techniques may be used to create this trench. The depth of trench 406 in cladding layer 401 is preferably in the range of approximately 1–3 microns, while its width is in the range of approximately 2–6 microns. However, the dimensions of trench 406 may vary greatly in other embodiments depending on the wavelength of light used, the amount of light needed for transmission, the packaging density required, and/or the technology employed. Hence, the thickness of cladding layer 401 may also vary greatly. Cladding layer 401 must be thick enough to accommodate trench 406 and to provide adequate separation between the bottom of trench 406 and substrate 400. Typically, adequate separation between the bottom of trench 406 and substrate 400 may be achieved by approximately 2–6 microns of cladding. The width of trench 406 may be in the sub-micron range or as wide as 100 microns.

The opening in metal layer 402 and trench 406 in FIG. 4b are both preferably anistropically etched and aligned to a single photolithographic masking layer. Thus, as can be seen in FIG. 4b, the walls of trench 406 will be approximately flush with the opening in metal layer 402. This provides for substantial self-alignment of trench 406 with the opening of metal layer 402. Another way to obtain such alignment may be to etch the opening in metal layer 402, then remove the photolithographic masking layer, then etch trench 406 into cladding layer 401 through the opening in metal layer 402. Alternatively, the opening in metal layer 402 may be isotropically etched through a photolithographic masking layer, while trench 406 is anistropically etched through the same masking layer. This will result in the opening in metal layer 402 being wider than the width of trench 406. In such a process, trench 406 will be centered beneath the wider opening in metal layer 402 since the width of trench 4–6 will be aligned to the same photolithographic mask.

Figure 4C:
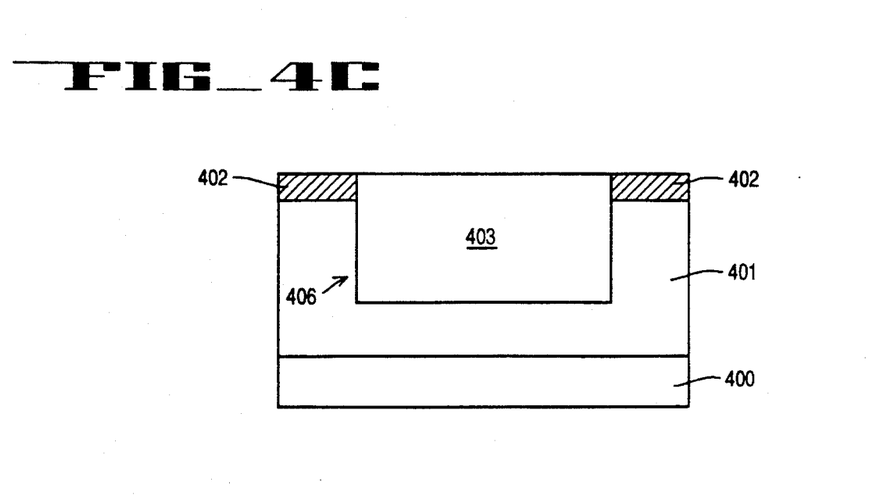
FIG. 4c is an illustration of a cross-sectional view of the substrate of FIG. 4b after the trench has been filled.

FIG. 4c shows the trench of FIG. 4b after it has been filled with active waveguide polymer 403. Waveguide polymer 403 preferably comprises a polyimide material having an unbiased (unpoled) index of refraction which is higher than the index of refraction of cladding layer 406. This polyimide material is spun coated over the substrate. The polyimide will planarize the surface of the substrate and fill trench 406. Then an etch back step will need to be performed to remove the excess polyimide material from the surface of metal layer 402. Thus, waveguide polymer 403 will become isolated within trench 406. The etch back step may be performed by any one of a number of techniques including chemical-mechanical polish, PIE (reactive ion etch), plasma, sputter, or wet etch. In such an etch back step, metal layer 402 may act as an etch stop. Waveguide polymer 403 may alternatively comprise any material whose index of refraction may be adjusted by applying an electric field to it.

Figure 4D:
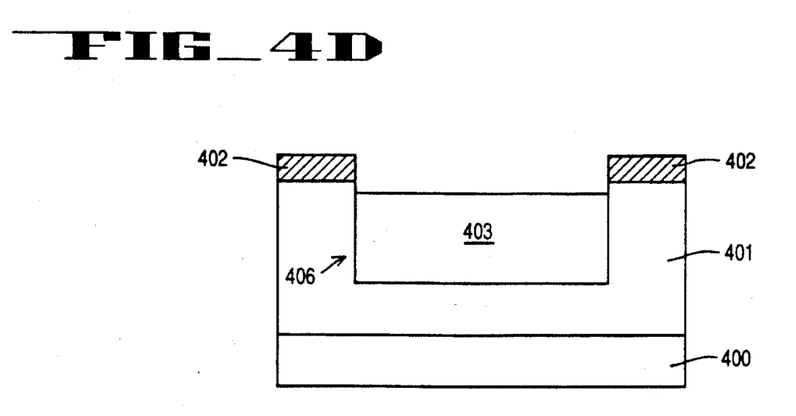
FIG. 4d is an illustration of a cross-sectional view of the substrate of FIG. 4c after the trench has been etched back.

FIG. 4d shows the trench of FIG. 4c after waveguide polymer 403 has been etched away from the edges of conductive layer 402. This is done because it has been found that allowing waveguide polymer 403 to come into direct contact with conductive layer 402 causes distortion and power loss in an optical wave traveling along the length of the waveguide (in a direction perpendicular to the page). Alternatively, this step may be unnecessary depending on the power transmission requirements of the practitioner. An alternate technique may be used whereby a thin waveguide polymer, such as an oxide, coats the walls of the trench along with the opening in metal layer 402. Such a coating layer, described below, would serve to separate waveguide polymer 403 from metal layer 402. In this technique, it may be unnecessary to form a buffer layer at the surface of the waveguide channel, as described below. Note that because many polyimide materials tend to flow or degrade at relatively low temperatures, such as those in excess of approximately 350° C., the coating layer should be deposited at a lower temperature to prevent destruction of the waveguide. In alternate embodiments where higher temperature cladding layers are used, higher process temperature may be employed.

Figure 4E:
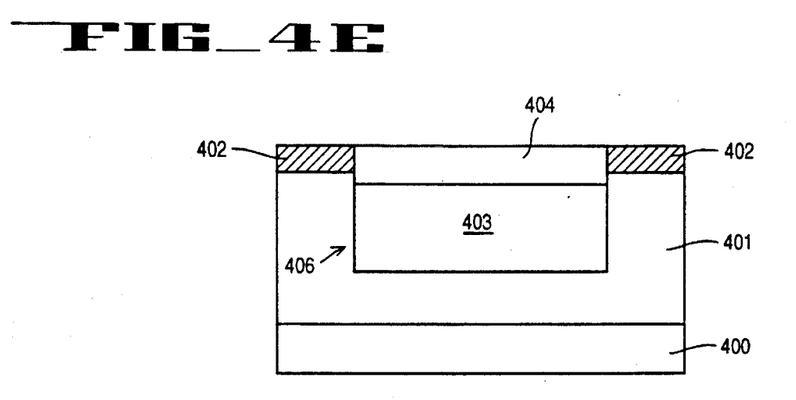
FIG. 4e is an illustration of a cross-sectional view of the substrate of FIG. 4d after a buffer layer has been formed.

FIG. 4e shows the trench of FIG. 4d after the trench has been backfilled with buffer layer 404. Buffer layer 404 preferably comprises a polyimide material having a refractive index which is lower than the refractive index of unbiased waveguide polymer 403. This polyimide material is spun coated onto the surface of the substrate. The polyimide will planarize the surface of the substrate and fill trench 406 along with the opening of metal layer 402. The polyimide material may then need to be etched back from the surface of metal layer 402 in order to isolate buffer layer 404 to the trench region as shown in FIG. 4e. Etch back techniques, such as those previously discussed, may be used. Buffer layer 404 may alternatively comprise other dielectric materials such as, for example, an oxide or any material having relatively stable refractive index.

Figure 4F:
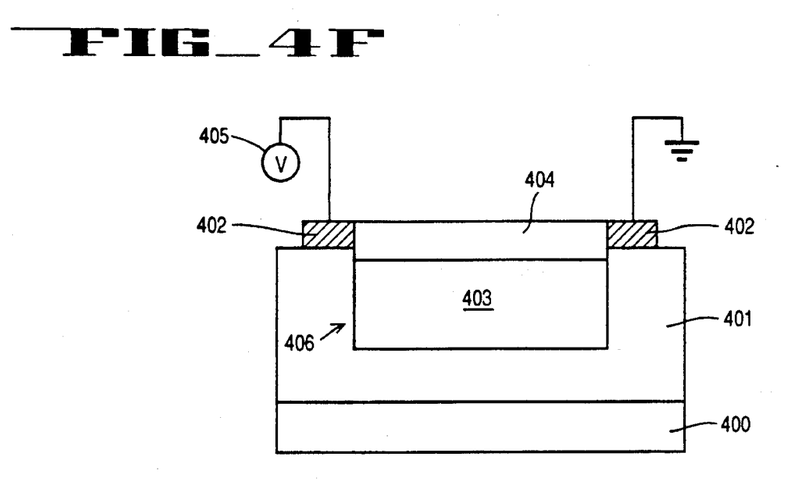
FIG. 4f is an illustration of a cross-sectional view of the substrate of FIG. 4e after a metal layer has been patterned.

FIG. 4f represents the substrate region shown in FIG. 4e after metal layer 402 has been patterned. In patterning metal layer 402, the metal region shown on the left side of trench 406 is electrically separated from the metal region shown on the right side of trench 406 such that each metal region may hold independent voltages without shorting to each other. In this manner, a voltage source 405 may be applied to the metal region on one side of trench 406 while the metal region on the other side of trench 406 is grounded. Thus, an electric field may be induced across trench 406 and through active waveguide polymer 403. By adjusting this electric field, the index of refraction of active waveguide polymer 403 can be adjusted. This is known as poling. More specifically, because active waveguide polymer 403 is poled in the gap between the two nodes shown, this technique is referred to as gap poling. By poling active waveguide polymer 403 and adjusting its index of refraction, an optical wave may be redirected to or from an adjacent waveguide. Redirection of optical waves is achieved because light traveling in a first medium has a tendency to be drawn into a second medium if the second medium has an index of refraction equal to the index of refraction of the first medium. Adjusting the index of refraction of an active waveguide polymer to match the index of refraction of an adjacent waveguide polymer will cause a certain percentage of light to be drawn into the active waveguide polymer from the adjacent waveguide. Thus the structure shown in FIG. 4f may be useful in an optical railtap. Alternatively, metal layer 402 may be patterned at the completion of the associated process step described above in conjunction with FIGS. 4c or 4d.

Figure 5A:
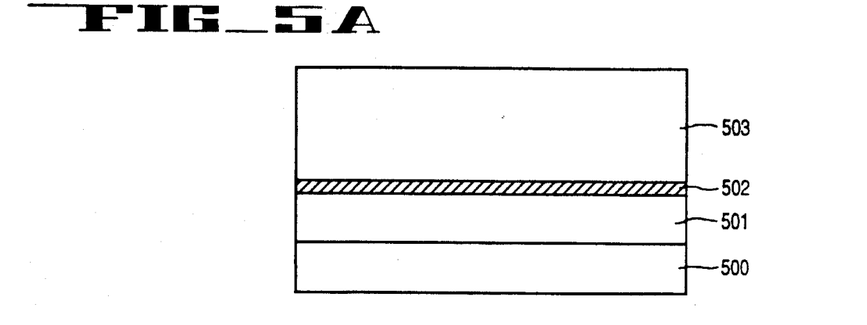
FIG. 5a is an illustration of a cross-sectional view of a substrate.

FIG. 5a is a cross-section showing a metal layer 502 sandwiched between an upper cladding layer 503 and a lower cladding layer 501 built on substrate 500. Upper cladding layer 503 and lower cladding layer 501 preferably comprise a polyimide material which has been spun coated to a thickness in the range of approximately 2–6 microns and which has a relatively consistent and stable index of refraction. Metal layer 502 is preferably formed over lower cladding layer 501 and comprises a sputtered aluminum alloy. Substrate 500 preferably comprises conventional semiconductor materials and devices such as silicon and oxides thereof. Substrate 500 may additionally comprise other waveguide materials or, alternatively, any material capable of sustaining lower cladding layer 501. The actual thickness of lower cladding layer 501 depends on the distance necessary to separate an optical wave traveling through upper cladding layer 503 from substrate 500 and is typically about 2–6 microns. Lower cladding layer 501 may alternatively comprise any material capable of adequately separating an optical wave traveling through upper cladding layer 503 from substrate 500. Metal layer 502 may alternatively be deposited on lower cladding layer 501 by a method including, for instance, chemical-vapor deposition (CVD). Metal layer 502 may comprise substantially pure aluminum (Al), chromium (Cr), gold (Au), alloys thereof, oxide, nitride, or any other material which may suitably act as an etch stop to a subsequently formed trench through upper cladding layer 503. Upper cladding lay 503 may comprise the same material as lower cladding layer 501. The thickness of upper cladding layer 503 may approximately correspond to the depth of a subsequently formed trench. Therefore, the thickness of upper cladding layer 503 may significantly vary depending on the practitioner's requirements for trench depth as discussed above.

Figure 5B:
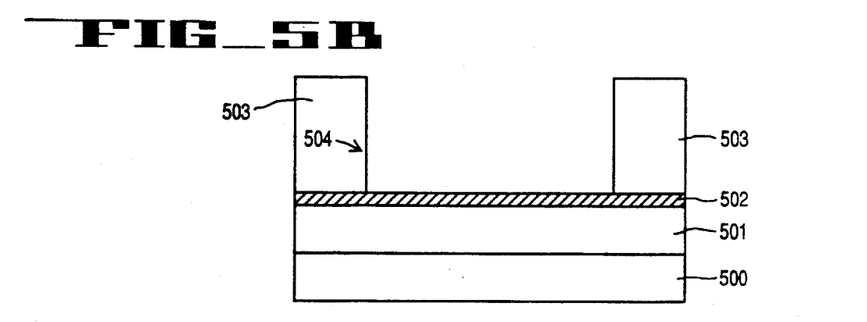
FIG. 5b is an illustration of a cross-sectional view of the substrate of FIG. 5a after a trench has been formed.

FIG. 5b shows a cross-section of the region illustrated in FIG. 5a after trench 504 has been anisotropically etched through upper cladding layer 503 using standard photolithographic and dry etch techniques. Trench 504 is etched through upper cladding layer 503 to metal layer 502 which acts an etch stop. Alternatively, all or a portion of metal layer 502 may be anisotropically etched in the same or subsequent step as the etching of trench 504.

Figure 5C:
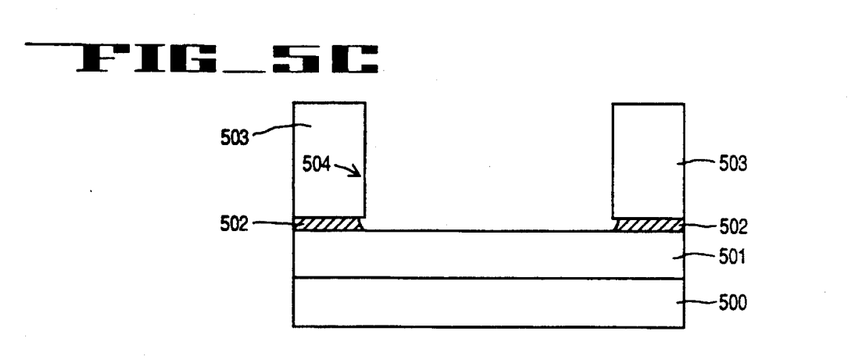
FIG. 5c is an illustration of a cross-sectional view of the substrate of FIG. 5b after an etch step has been executed.

FIG. 5c shows the substrate portion illustrated in FIG. 5b after metal layer 502 is removed from the bottom region within trench 504 by a wet-etch process step. An important feature of metal layer 502 is that it protects the underlying lower cladding layer 501 during the anisotropic etch of upper cladding layer 503. Such an anisotropic etch, whether it be sputter, plasma, or reactive ion etch (R/E), can cause significant damage to a cladding layer including roughing the surface, pitting, and forming divots in the floor of the trench. If the floor of trench 504 is not smooth, an optical wave traveling through the trench will experience propagation loss because the rough surface in the trench will cause the optical wave to scatter. This rough surface of the trench floor is a result of energetic ion bombardment. Metal layer 502 serves to shield the underlying lower cladding layer 501 from these energetic ions during the anisotropic etch of upper cladding layer 503. As a result, when metal layer 502 is subsequently removed from the region within trench 504 as shown in FIG. 5c, a smooth surface of lower cladding layer 501 is revealed. While the portion of metal layer 502 in the region within trench 504 is preferably removed using a wet etch process, other etch processes may be employed which do not cause significant roughing of lower cladding layer 501.

Figure 5D:
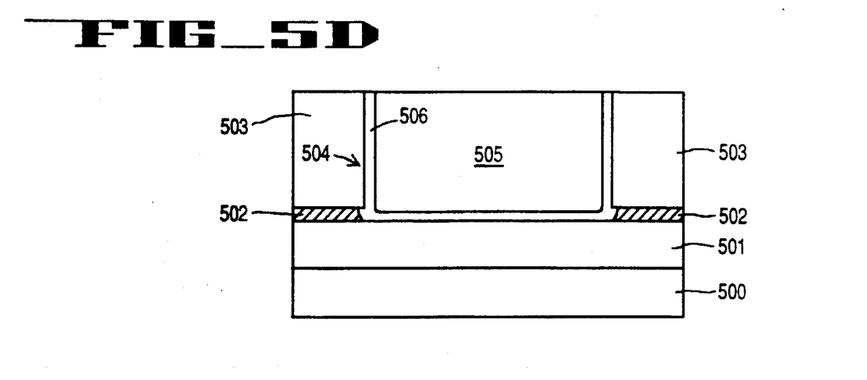
FIG. 5d is an illustration of a cross-sectional view of a substrate having a filled trench formed therein.

FIG. 5d shows the region illustrated in FIG. 5c after waveguide polymer 505 and coating layer 506 have been formed in trench 504. Waveguide polymer 505 comprises a polyimide material and is deposited by spin-coating this polyimide material over the surface of the substrate while coating layer 506 comprises a low temperature, CVD oxide. The polyimide will planarize the surface of the substrate and substantially fill trench 504. Then the excess polyimide material and coating oxide is etched back such that it is removed from regions outside of trench 504, such as, for example, the surfaces of upper cladding layer 503. Alternatively, waveguide polymer 505 may be deposited by a CVD process, preferably at a temperature low enough so as not to cause upper cladding layer 503 to degrade as discussed above. Waveguide polymer 505 may comprise other materials capable of channeling an optical wave such as, for instance, an oxide of silicon. In addition, waveguide polymer 505 preferably has an index of refraction higher than the index of refraction of upper cladding layer 503 and lower cladding layer 501.

As discussed above, it may be undesirable for a waveguide to come into contact with metal. Therefore, thin coating layer 506 may be formed within trench 504 to coat the regions of metal layer 502 which would otherwise come into direct contact with waveguide polymer 505. In alternate embodiments, coating layer 506 may comprise nitride or any other material with suitable optical properties. Also note that, as discussed above, coating layer 506 may not be necessary in all applications depending on the practitioner's requirements. for example, if the signal degradation caused by the metal is tolerable in a particular application, it would probably be more cost beneficial to eliminate the step of forming coating layer 56.

Figure 6A:
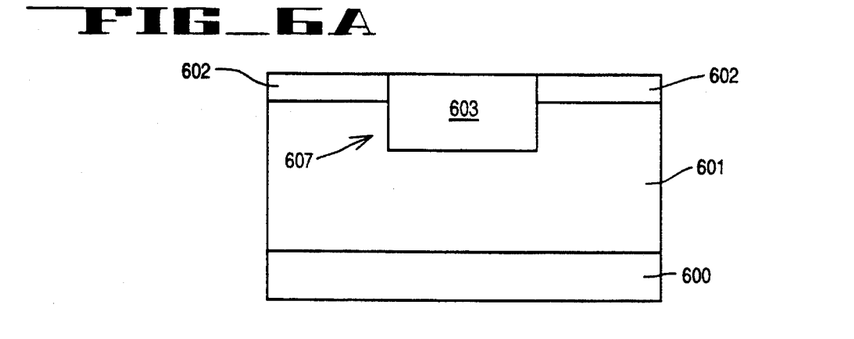
FIG. 6a is an illustration of a cross-sectional view of a substrate having a filled trench formed therein.

FIG. 6a is a cross-section showing a waveguide channel (trench) 607 which has been formed through metal layer 602 and into cladding layer 601 on substrate 600 and then filled with waveguide polymer 603. The cross-section as illustrated in FIG. 6a may be formed in a manner similar to the two techniques previously described. Waveguide polymer 603 is preferably comprised of a passive waveguide material whose index of refraction remains relatively unaffected by the application of an electric field. Metal layer 602 may comprise Al, Cu, Au, Ag, and alloys thereof, or any other conductive material which may be deposited by sputter or CVD techniques. Alternatively, since, as will be seen, the purpose of metal layer 602 is to simply act as a barrier to an etch step, any material suitable for such a use may be employed in place of or in addition to metal layer 602.

Figure 6B:
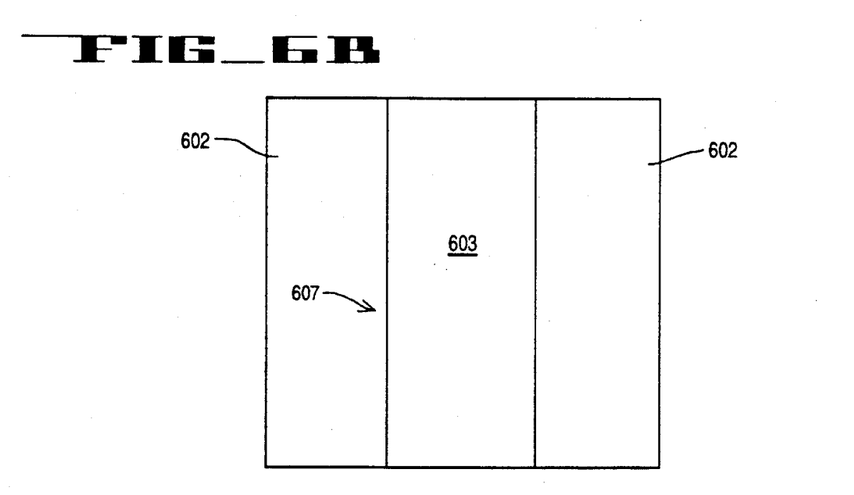

FIG. 6b illustrates a "top down" surface view of the cross-section in FIG. 6a, where waveguide polymer 603, waveguide channel 607, and metal layer 602 can be seen.

Figure 6C:
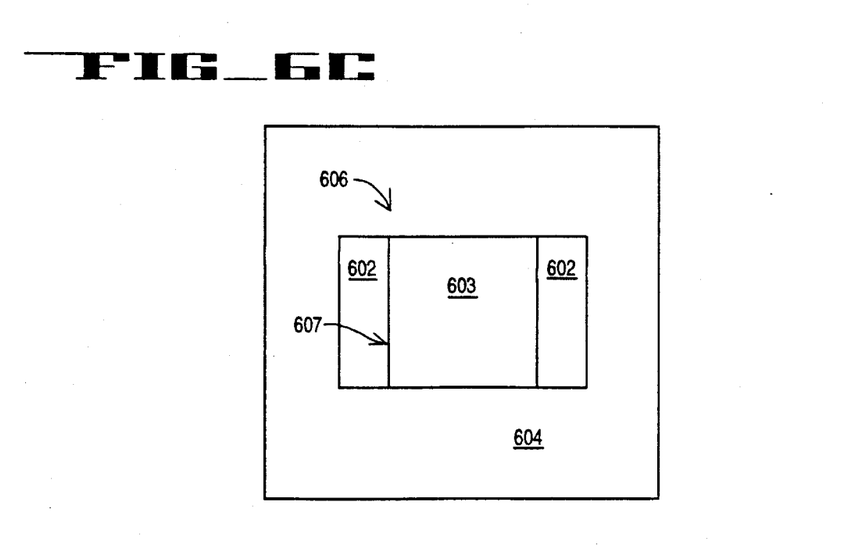
FIG. 6c is an illustration of a surface view of the substrate of FIG. 6b after a mask has been formed.

FIG. 6c illustrates a currently preferred embodiment of the present invention showing the region shown in FIG. 6b after a photoresist masking layer 604 has been formed in the region and a gap 606 has been formed therein using standard photolithographic techniques. Through gap 606 can be seen a portion of waveguide polymer 603 in waveguide channel 607 along with juxtaposing sections of metal layer 602. Since the purpose of masking layer 604 is to restrict a subsequent etch step to the gap region formed therein, masking layer 604 may alternatively comprise any material, such as, for instance, a metal or oxide of silicon, which exhibits resistive properties to the subsequent etch step described below.

Figure 6D:
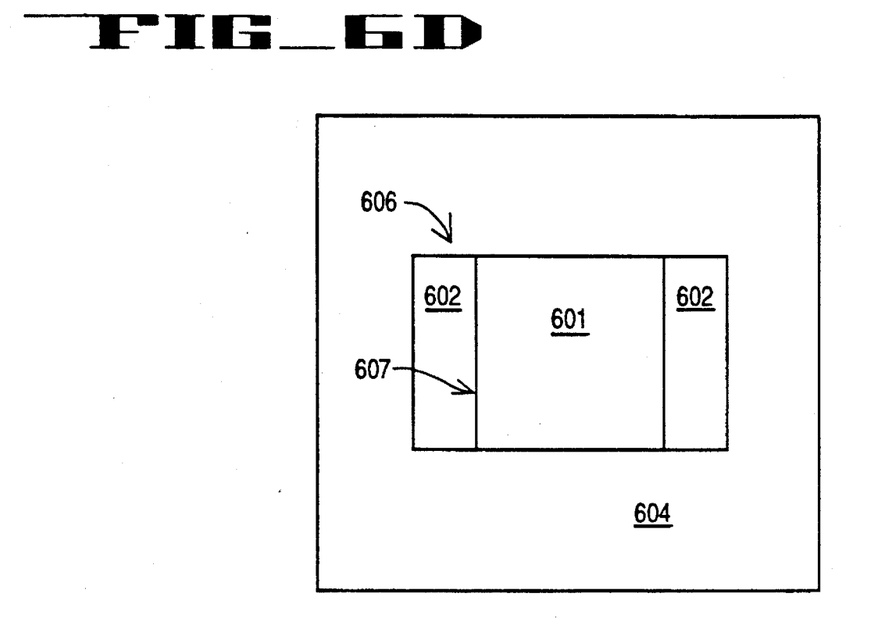
FIG. 6d is an illustration of a surface view of the substrate of FIG. 6c after the trench has been etched.

FIG. 6d illustrates the region shown in FIG. 6c after waveguide polymer 603 has been preferably anisotropically etched from trench 607 within gap 606 to a depth approximately equal to the depth of trench 607 in order to expose the underlying cladding layer 601. The etch of waveguide polymer 603 has been bounded in a direction parallel to waveguide channel 607 (at the top and bottom of exposed waveguide channel 607, as shown) by masking layer 604. Etch boundaries in this direction, therefore, are determined by the dimensions of gap 606. Conversely, in the transverse direction, the etch of waveguide polymer 603 from trench 607 is bounded on either side by metal layer 602 exposed within gap 606. Therefore, the width of the etch of waveguide polymer 603 in trench 607 is aligned to the same metal layer through which trench 607 was originally etched. This results in a self-aligned etch of waveguide polymer 603 from trench 607. Achieving the proper depth of the etch of waveguide polymer 603 may be accomplished by etch rate discrepancies between waveguide polymer 603 and cladding layer 601, an appropriate endpoint detection system, or an appropriately timed etch.

Figure 6E:
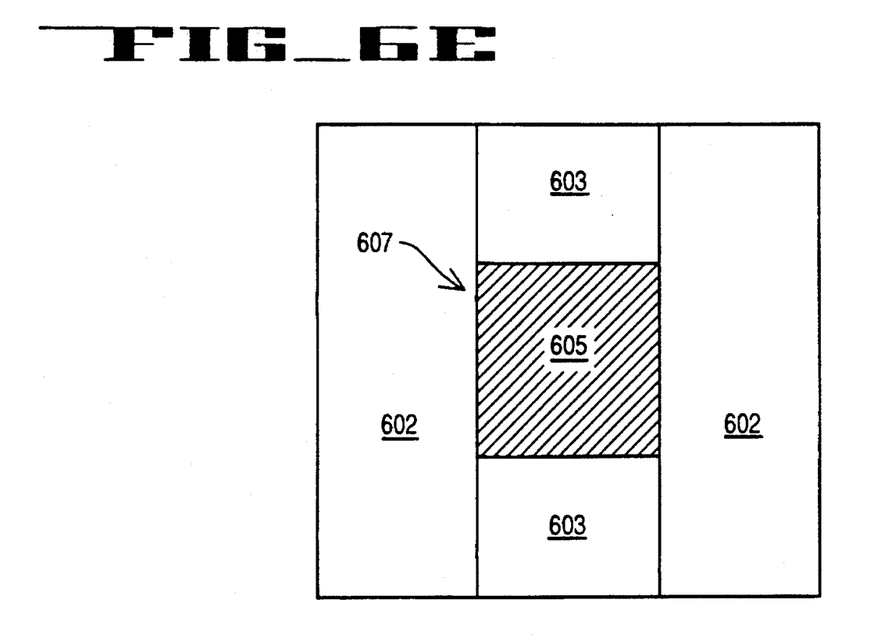
FIG. 6e is an illustration of a surface view of the substrate of FIG. 6d after the mask has been removed and the trench has been filled.

FIG. 6e illustrates the region shown in FIG. 6d after masking layer 604 has been removed, trench 607 has been preferably refilled with active waveguide polymer 605, and the active waveguide polymer has been etched from the surface of the substrate in order to isolate active waveguide polymer 605 to within trench 607. In a preferred embodiment, active waveguide polymer 605 comprises a polyimide material which is spun coated onto the surface of the substrate and substantially fills the portion of trench 607 from which passive waveguide polymer 603 has been removed. The polyimide material is then etched back, using, for instance, one or more of the etch back techniques previously discussed. During this etch back process step, metal layer 602 is preferably used as an etch stop to align the surface of active waveguide polymer 605 to the surface of metal layer 602. Active waveguide polymers other than polyimide, such as acrylates and epoxies, which exhibit similarly electrically adjustable indices of refraction, may be used. Thus, as can be seen in FIG. 6e, a continuous waveguide channel 607 having partially passive and partially active waveguide polymer portions has been formed.

In an alternate embodiment of the present invention, active waveguide polymer 605 may be swapped with passive waveguide polymer 603 in order to achieve a similar result. Also, in an alternate embodiment, masking layer 604 may be left on the surface of the substrate shown in FIG. 6e. As stated earlier, it may be undesirable to have a waveguide polymer in contact with metal layer 602. Therefore, passive waveguide polymer 603 and active waveguide polymer 605 may be etched away from metal layer 602 and backfilled with a buffer layer. Alternatively, a thin coating layer may be deposited within trench 607 before depositing passive waveguide polymer 603, thereby separating passive waveguide polymer 603 and active waveguide polymer 605 from metal layer 602.

Waveguide channel 607 may be found useful in, for instance, optical railtap applications where only a small portion of a waveguide need be constructed of an active waveguide polymer. Since active waveguide polymers tend to be more lossy than passive waveguide polymers, a railtap constructed in a manner similar to waveguide 607 may exhibit high optical throughput by isolating the active waveguide polymer only to the region of the waveguide where it is necessary. For example, in the optical railtap depicted in FIG. 3, the method described, in conjunction with FIG. 6a–6b, may be employed in order to form waveguide 32 from an active polymer within the region 30 while the remainder of waveguide 32 comprises passive polymers. Thus, the low-loss, passive waveguide polymer portion of waveguide 32 serves to improve the signal transmission of output light while the active waveguide portion 30 of waveguide 32 may be poled in order to draw light into waveguide 32 form adjacent waveguide 31. Where one desires to perform gap poling of the active waveguide polymer in waveguide 607, metal layer 602 may be subsequently patterned to accommodate such poling, as described above in conjunction with FIG. 4f. In this manner, active waveguide polymer 605 may be poled in order to adjust the index of refraction in that region of waveguide 607.

Thus, techniques for manufacturing waveguide channels and devices have been described.

What is claimed is:

1. A method of forming a self-aligned, active waveguide channel for gap-poling, said method comprising the steps of:
   (a) forming a cladding layer over a substrate;
   (b) forming a conductive layer over said cladding layer;
   (c) etching an opening in said conductive layer;
   (d) etching a trench in said cladding layer through said opening in said conductive layer;
   (f) forming an active waveguide polymer within at least a portion of said trench; and
   (g) etching said conductive layer so as to electrically separate a first portion of said conductive layer residing on one side of said trench from a second portion of said conductive layer residing on the other side of said trench such that said active waveguide polymer may be poled.

2. The method of claim 1 further comprising the step of coating said trench with a coating layer before filling said trench with said waveguide polymer.

3. The method of claim 1 further comprising the step of etching at least a portion of said waveguide polymer which exists substantially over said conductive layer such that said waveguide polymer becomes substantially isolated from the surface of said conductive layer within said trench.

4. The method of claim 3 further comprising the step of etching said waveguide polymer away from said conductive layer in said trench and backfilling said trench with a buffer layer.

5. The method of claim 1 wherein said etching of said opening in said conductive layer and said etching of said trench in said cladding layer are performed substantially anisotropically such that said trench is substantially aligned with said opening in said conductive layer.

6. The method of claim 1 wherein said etching of said opening in said conductive layer includes a substantially isotropic etch of said conductive layer and said etching of said trench in said cladding layer is performed substantially anisotropically such that said trench in said cladding layer is substantially centered beneath said opening in said conductive layer, and said trench is narrower than said opening in said conductive layer.

7. The method of claim 1 wherein said cladding layer and said waveguide polymer primarily comprise a polyimide material.

8. The method of claim 1 wherein said conductive layer primarily comprises a material selected from the group consisting of Al, Cu, Au, Ag, and any combination thereof.

9. A method of forming a waveguide channel, said method comprising the steps of:
   (a) forming a cladding layer over a substrate;
   (b) forming a barrier layer over said cladding layer;
   (c) etching an opening in said barrier layer;
   (d) etching a trench in said cladding layer through said opening in said barrier layer;
   (e) forming a first waveguide polymer within at least a portion of said trench;
   (f) forming a masking layer, said masking layer having a gap over at least a portion of said trench;
   (h) etching at least a portion of said first waveguide polymer from a region within said trench, said etch of said first waveguide polymer being substantially aligned to said gap in said masking layer at one boundary and substantially aligned to said opening in said barrier layer at another boundary; and
   (i) forming a second waveguide polymer within at least a portion of said region of said trench.

10. The method of claim 9 further comprising the step of coating said trench with a coating layer before filling said trench with said first waveguide polymer.

11. The method of claim 9 further comprising the step of etching at least a portion of said second waveguide polymer which exists substantially over said barrier layer such that said second waveguide polymer becomes substantially isolated within said trench.

12. The method of claim 11 further comprising the step of etching said second waveguide polymer away from said barrier layer in said trench and backfilling said trench with a buffer layer.

13. The method of claim 11 wherein said barrier layer acts as an etch-stop for said etching of said portion of said second waveguide polymer which exists substantially over said barrier layer.

14. The method of claim 9 wherein said first waveguide polymer is passive and said second waveguide polymer is active.

15. The method of claim 10 wherein said first waveguide polymer is passive and said second waveguide polymer is active.

16. The method of claim 12 wherein said first waveguide polymer is passive and said second waveguide polymer is active.

17. The method of claim 9 wherein said barrier layer primarily comprises a metal.

18. The method of claim 17 wherein said second waveguide polymer comprises an active material and said barrier layer is used for gap poling said active material.

19. The method of claim 9 wherein said cladding layer, said first waveguide polymer, and said second waveguide polymer primarily comprise a polyimide material.

* * * * *

UNITED STATES PATENT AND TRADEMARK OFFICE
CERTIFICATE OF CORRECTION

PATENT NO. : 5,465,860
DATED : November 14, 1995
INVENTOR(S) : Fujimoto et al.

It is certified that error appears in the above-indentified patent and that said Letters Patent is hereby corrected as shown below:

In column 5 at line 22 delete "PIE" and insert --RIE--

In column 7 at line 11 delete "(R/E)," and insert --(RIE),--

Signed and Sealed this

Twenty-fifth Day of February, 1997

Attest:

BRUCE LEHMAN

*Attesting Officer*    *Commissioner of Patents and Trademarks*